(12) United States Patent
Mizuhashi et al.

(10) Patent No.: US 7,734,143 B2
(45) Date of Patent: Jun. 8, 2010

(54) IMAGE PROCESSING APPARATUS CAPABLE OF ADJUSTING IMAGE QUALITY BY USING MOVING IMAGE SAMPLES

(75) Inventors: Yoshiaki Mizuhashi, Yokohama (JP); Mitsuo Nakajima, Yokohama (JP); Yasutaka Tsuru, Kamakura (JP); Koichi Hamada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1132 days.

(21) Appl. No.: 11/343,217

(22) Filed: Jan. 31, 2006

(65) Prior Publication Data
US 2006/0282867 A1 Dec. 14, 2006

(30) Foreign Application Priority Data
Jun. 13, 2005 (JP) ............................... 2005-171797

(51) Int. Cl.
*H04N 7/00* (2006.01)
*H04N 7/26* (2006.01)

(52) U.S. Cl. ......................................... 386/46; 386/124

(58) Field of Classification Search .................. 386/46, 386/107, 117, 113, 114, 21, 52, 124, 125
See application file for complete search history.

(56) References Cited

U.S. PATENT DOCUMENTS
2002/0093518 A1* 7/2002 Nakano ....................... 345/643

FOREIGN PATENT DOCUMENTS
JP 2001-268475 9/2001

* cited by examiner

*Primary Examiner*—Robert Chevalier
(74) *Attorney, Agent, or Firm*—McDermott Will & Emery LLP

(57) ABSTRACT

A disclosed technique for adjusting the image quality uses a moving picture for a sample stored in advance on a storage medium. A plurality of sample moving picture images, based on the moving picture for a sample read from the storage medium, having different image quality relative to each other are displayed on the screen. This technique enables confirmation of how the actual image having been subjected to the image quality adjustment would be displayed in an apparatus for displaying a moving image, such as a television receiver, because the sample stored on the storage medium is a moving picture.

20 Claims, 9 Drawing Sheets

IMAGE PROCESSING APPARATUS CAPABLE OF ADJUSTING IMAGE QUALITY BY USING MOVING IMAGE SAMPLES

TECHNICAL FIELD

The present subject matter relates to a technique for adjusting the image quality in an image display apparatus, such as a television receiver, or an image processing apparatus, such as a DVD player or a set-top box.

BACKGROUND

For example, Japanese Patent Publication No. 2001-268475 discloses a technique for simultaneously displaying an image that has been subjected to a specific image quality adjustment and an image that has not been subjected to the specific image quality adjustment when performing the image quality adjustment. For example, FIG. 5(B) of the above Japanese Patent Publication discloses a technique that enables the image quality adjustment through the steps of compressing an image reproduced by a DVD player, displaying side-by-side a compressed image, having been subjected to a specific image quality adjustment and a source image, to allow the user to compare the images before and after making the image quality adjustment.

In the above Japanese Patent Publication, the images before and after making the image quality adjustment are displayed side-by-side, for example, using the images reproduced by a DVD player. The images are displayed depend on the contents of media (images) that are reproduced by a DVD player. Accordingly, there is a case in which the images displayed side-by-side by use images that are inappropriate for comparing the states of the images before and after making the image quality adjustment. For example, in the case of adjusting a specific color such as red or blue, it is difficult to visually recognize the difference between the images before and after making the color adjustment on the side-by-side display if the images are low in saturation and dark as a whole (for example, the images from the DVD player are of a forest at night). In such a case, it is difficult for a user to confirm whether or not the image quality adjustment is desirable.

Hence, the needs exist for providing a preferable technique for improving the usability with respect to the image quality adjustment by further facilitating the image quality adjustment.

SUMMARY

The methods and apparatuses disclosed herein alleviate one or more of the above noted problems. For an image quality adjustment, an image processing generates a first sample moving picture image by setting image quality of at least a portion of a moving picture for a sample read from a storage medium into a first state. The processing also generates a second sample moving picture image by setting the image quality of at least a portion of the moving picture for a sample read from the storage medium into a second state that is different from the first state. The first and second sample moving pictures are displayed on a same screen of a display unit.

This technique enables confirmation of how the actual image having been subjected to the image quality adjustment would be displayed in such an apparatus for displaying a moving image as a television receiver because the sample stored on the storage medium is a moving picture.

The storage medium may be a hard disk or a semiconductor memory such as a flash memory. Further, this technique may enable adjustment of at least one kind of image quality among an Interlace/Progressive conversion process, the number of frame rates, contour, noise reduction, contrast, hue, saturation, gamma, and brightness.

According to the above technique, it is possible to improve the usability with respect to the image quality adjustment and obtain the image quality that is favorable for a user.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a through understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Figure 1:
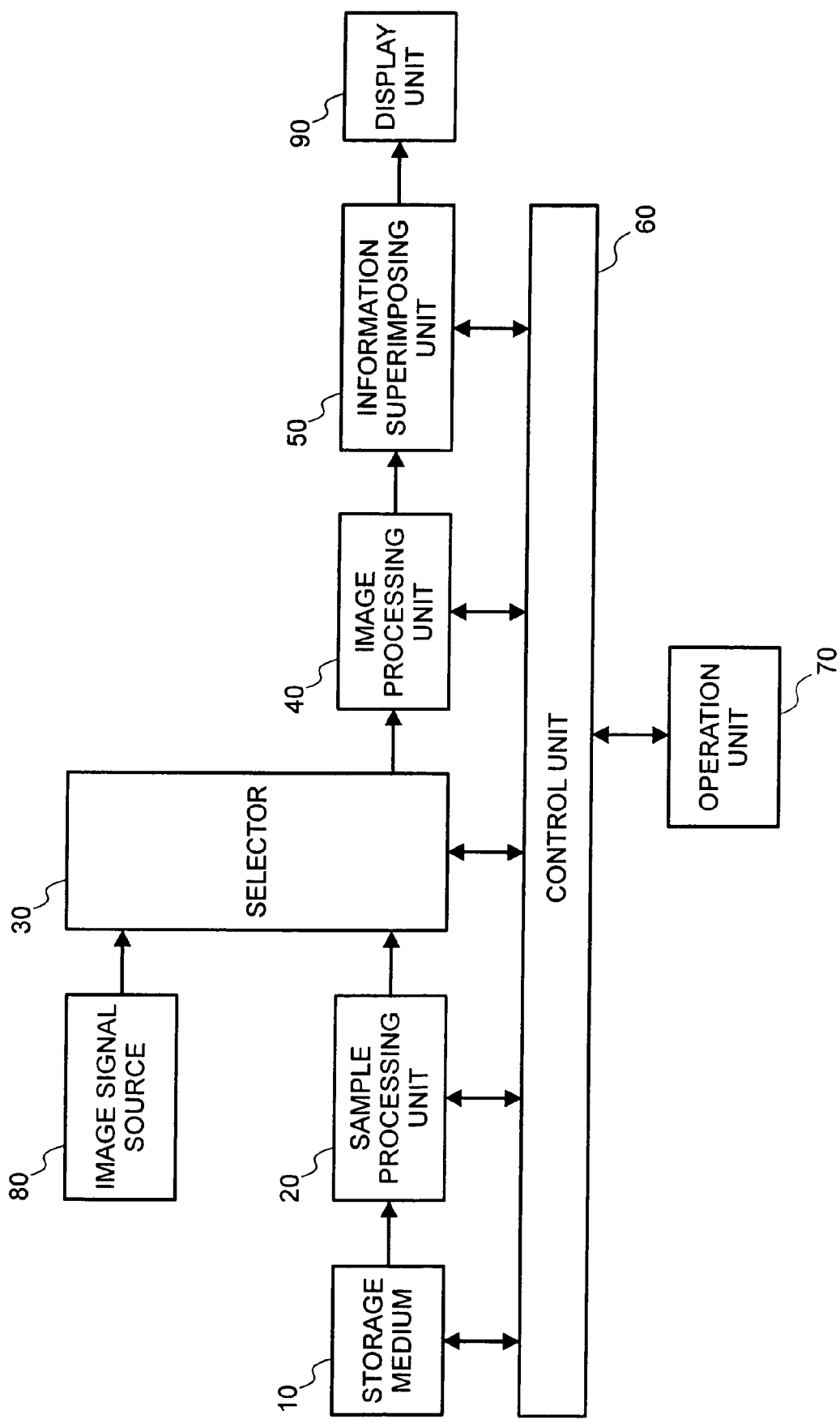
FIG. 1 is a block diagram of the first example in an image display apparatus.

FIG. 1 is a block diagram illustrating the first example of an image processing apparatus for providing the quality adjustment technique. In the following description, an image display apparatus such as a television receiver comprising a display unit 90 will be described as the image processing apparatus although the technique may be implemented in other equipment. In FIG. 1, an image signal source 80 may include, for example, a tuner for receiving an analog television broadcasting signal and/or a digital television broadcasting signal. Further, the image signal source 80 may include an input terminal into which an image signal being output from an external image-output apparatus such as a DVD player, a VTR, or a set-top box is input. The output signal from the image signal source 80 is supplied to one of the input terminals of a selector 30.

In the first example, the image processing apparatus has a storage medium 10 on which an image signal, such as the output from the image signal source 80, can be stored in a digital format. The storage medium 10 may be implemented by, for example, a hard disk drive or a semiconductor memory such as a flash memory, and is controlled in accordance with a control signal from a control unit 60. The control unit 60 may be implemented by, for example, a microcomputer 60. At the time of recording an image signal, the image signal (or voice signal) being output from the image signal source 80 is stored on the storage medium 10 with, for example, a write instruction issued from the control unit 60 that has responded to the operation from an operation unit 70. Further, at the time of reproducing an image signal, the image signal (or voice signal) stored on the storage medium 10 is read out with, for example, a read instruction issued from the control unit 60 that has responded to the operation from the operation unit 70.

The storage medium 10 according to the first example is not only provided with an image recording/reproducing function as described above, but also preliminarily stores moving picture for a samples that are utilized for the image quality adjustment of the image, so that the storage medium 10 is utilized even when making the image quality adjustment. The moving picture for a samples stored on the storage medium 10 are suitable for the respective image quality adjustments of the image. For example, the storage medium 10 stores the moving pictures, of which the primary colors such as red, blue and green are vibrant, as the moving picture for a samples for color adjustment. Further, the storage medium 10 stores the moving pictures with, for example, high vertical/horizontal spatial frequency as the moving picture for a samples for adjusting vertical/horizontal enhancers (contour correction and sharpness correction). Furthermore, the storage medium 10 stores the moving pictures in which, for example, an object including a diagonal line is moving as the moving picture for a samples for adjusting the Interlace/Progressive conversion (hereinafter, referred to as I/P conversion) setting process.

As described above, the storage medium 10 according to the first example stores the plurality of moving picture samples associated with the kinds of image quality adjustments. The moving picture for a sample stored on the storage medium 10 is read with a read instruction issued from the control unit 60. The moving picture for a sample that has been read from the storage medium 10 is supplied to a sample processing unit 20. The sample processing unit 20 performs a predetermined signal processing on the data of the moving picture for a sample that has been read from the storage medium 10, and outputs the processed data to the other one of the input terminals of the selector 30. The sample processing unit 20 may be implemented by, for example, a signal processing circuit having a frame memory or a computer program stored in a memory and executed a microprocessor of the control unit 60.

The selector 30 switches so as to output the image signal that has been supplied from the image signal source 80 to one of the input terminals of the selector 30 or the moving picture for a sample that has been supplied to the other one of the input terminals of the selector 30 in accordance with an instruction from the control unit 60 that, for example, in response to a user activated operation from the operation unit 70. The control unit 60 issues to the selector 30 an instruction for selecting and outputting the image signal being output from the image signal source 80 in a normal operation mode (a normal display mode in which television broadcasting or the like is displayed on the whole screen), or for selecting and outputting the moving picture for a sample in an image quality adjustment mode. Specifically, the selector 30 has a function of a mode selector, and selects an image to be displayed on the screen of a display unit 90 in accordance with a mode of the image display apparatus. The image signal or the moving picture for a sample selected by the selector 30 is supplied to an image processing unit 40.

In accordance with the instruction issued from the control unit 60, the image processing unit 40 performs each selected kind of signal processing. One example of such processing is the image quality adjustments such as I/P conversion setting process for converting the signal selected by the selector 30 into a progressive format when the signal is in the interlaced format. Other examples of such processing include a scaling setting process for interpolating the pixel in the horizontal and vertical directions so that the selected signal matches the definition of the screen of the display unit 90, a frame rate (hereinafter, referred to as FR) change process for changing the frame rate (the number of frames per second) of the selected signal, a contrast correction setting process, a noise reduction setting process, a brightness correction setting process, a gamma correction setting process, and a color correction setting process (hue and saturation correction). The image processing unit 40 may be implemented by, for example, a signal processing circuit having a frame memory or a computer program stored in a memory and executed by a microprocessor of the control unit 60.

The signal processed by the image processing unit 40 is supplied to an information superimposing unit 50 where on-screen display type graphic information, such as a cursor that is generated by the control unit 60, is multiplexed. The signal output from the information superimposing unit 50 is supplied to the display unit 90, and then the display unit 90 displays the image on the screen in accordance with the supplied signal from the superimposing unit 50. The display unit 90 may be a flat panel display device such as a PDP, an LCD, and an FED. However, the display unit 90 may be a CRT, and the image display apparatus according to the first example also is applicable to a projection-type display apparatus. The above-described operation unit 70 may be, for example, a remote control device or a control panel for operating the image display apparatus.

Figure 2:
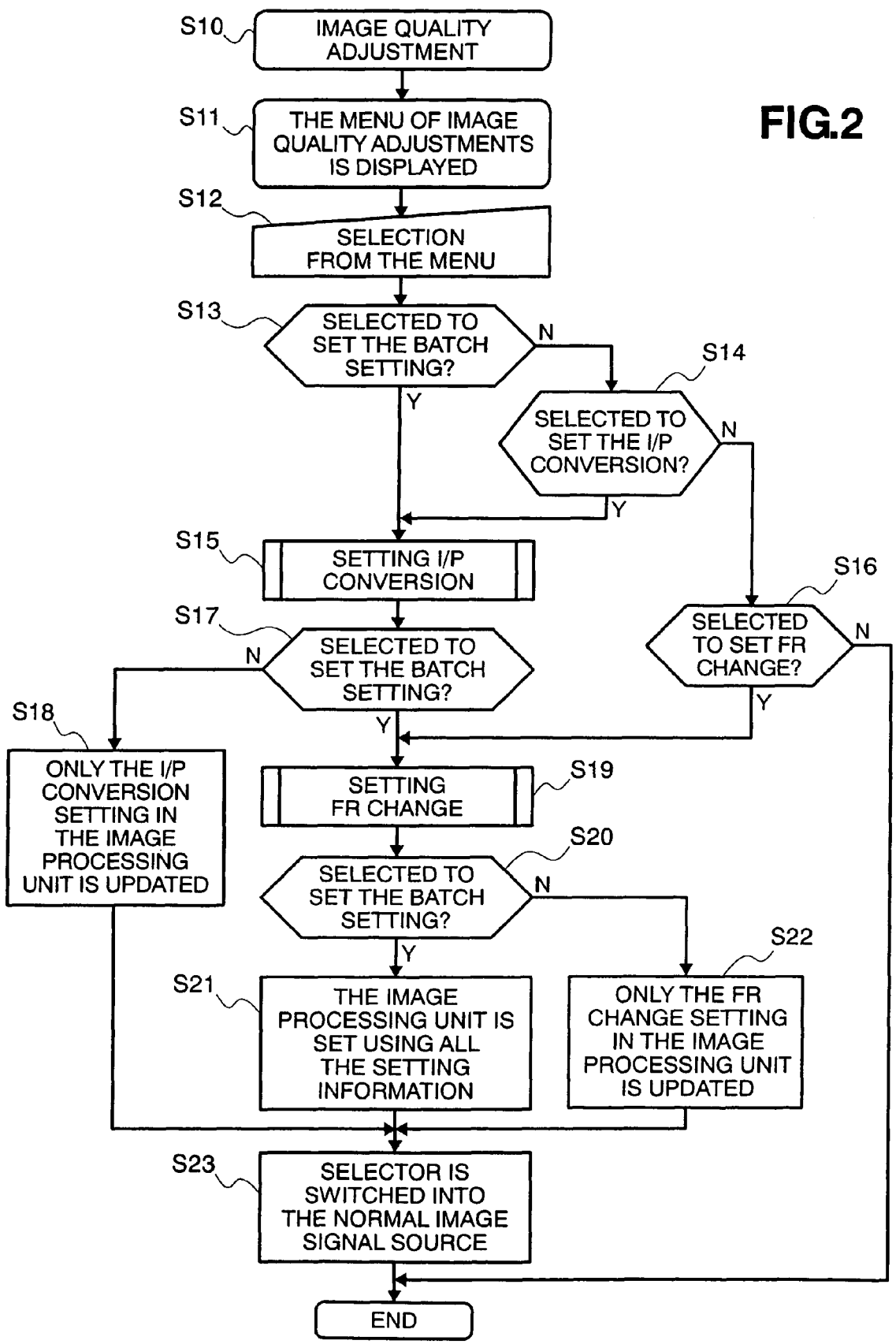
FIG. 2 is a flow chart of a process of an image quality adjustment according to the first example.

Next, the operations of the respective units when the image quality adjusting mode is selected in the first example are described with reference to flowcharts of FIGS. 2 and 3, and at the same time, by using FIGS. 4 to 8. In step S10 of FIG. 2, the image quality adjustment starts under the control by the control unit 60, for example, when a user operates one or more specific buttons mounted on the operation unit 70. In step S10, the control unit 60 controls the information superimposing unit 50 in response to the specific buttons being pushed. The information superimposing unit 50 generates a menu screen 260 in step S11 as shown in, for example, FIG. 4, and multiplexes an image 250 output from the image signal source 80 with the menu screen 260 so as to be displayed on the screen of the display unit 90. The menu screen 260 includes, for example, first and second windows as shown in FIG. 4.

The first window contains the items of "image quality adjustment", "sound quality setting", and "initialization", any one of which is selected by the user. Any one of the items on the first window is selected by operating cursor, keys mounted on the operation unit 70, and then the second window is displayed to the immediate right to the first window in response to the selection of the item. Here, when "image quality adjustment" is selected on the first window, the second window displays the items available for selecting which image quality is to be adjusted or set. In the illustrated example, the available adjustment items include "batch setting", "Interlace/Progressive conversion setting", and "frame rate change setting". In FIG. 4, only three kinds of items such as the batch setting, the I/P conversion setting, and the frame rate (FR) change setting are shown as the items of the image quality adjustment/setting for the sake of simple illustration. However, it goes without saying that the other items relating to image quality other than the above items may be displayed. For example, the second window may contain items for selecting hue (color shade) adjustment, saturation adjustment, sharpness setting (contour correction), contrast adjustment, gamma setting, noise reduction setting, brightness adjustment, color temperature adjustment, and the like.

Thereafter, the flow proceeds to step S12 where the user selects any one of the items for image quality adjustment on the second window of the menu screen 260 by operating the cursor keys on the operation unit 70. When any one of the items for image quality adjustment/setting is selected on the second window, the operation mode of the image display apparatus is switched from the normal operation mode to the image quality adjustment mode. Note that, when the item of "return" is selected on the second window, the process of the image quality adjustment is completed so that the screen returns to the original.

In step S13, the control unit 60 judges whether or not the image quality adjustment selected in step S12 (that is, selected on the second window) is "batch setting". In the case where "batch setting" is selected, a plurality of image quality adjustments/settings listed under "batch setting" on the second window can be continuously conducted in accordance with a predetermined sequence. In the example of FIG. 4, the I/P conversion setting and the FR change setting are continuously conducted. When "batch setting" is selected in step S13, that is, the flow proceeds to "Y", the flow proceeds to step S15 to perform the I/P conversion setting process. On the other hand, when "batch setting" is not selected in step S13, that is, the flow proceeds to "N", the flow proceeds to step S14. In step S14, the control unit 60 judges whether or not the image quality adjustment selected in step S12 is the I/P conversion setting. When the result is "Y", the flow proceeds to step S15 to perform the process of I/P conversion setting. When the result is "N", the flow proceeds to step S16 to determine whether or not "frame rate change setting" is selected.

Here, the content of the subroutine process in step S15, that is, one concrete example of the I/P conversion setting process will be described with reference to FIG. 3. First, the control unit 60 controls the storage medium 10 to reproduce the predetermined moving picture for a sample in step S31 of FIG. 3. In this case, since the I/P conversion setting is selected, the storage medium 10 is controlled so that the moving picture for a sample for the I/P conversion setting process, for example, the moving picture for a sample of the image in which an object including a diagonal line is scrolling, is read out among the plurality of moving picture for a samples that are stored on the storage medium 10. Next, the control unit 60 controls the sample processing unit 20 so as to perform the predetermined process on the moving picture for a sample read from the storage medium 10.

In the case where the moving picture for a sample is image data that has been compressed by utilizing, for example, MPEG (Moving picture Experts Group) or the like, the sample processing unit 20 decompresses the compressed image data. The moving picture for a sample that has been subjected to the decompression process corresponds to an image 200 as shown in, for example, FIG. 5, and the size of the image is made equal to, for example, the image screen of the display unit 90. The sample processing unit 20 performs a process of size reduction for the moving picture for a sample shown in FIG. 5 in order to reduce the number of horizontal pixels into half.

The following is an example as a method of the process of size reduction. Specifically, there are generated the pixels configuring the moving picture for a sample which is reduced in size in the horizontal direction based on the following Formula 1 where $P_{2N}$ is an even number pixel in the horizontal direction of the moving picture for a sample, $P_{2N+1}$ is an odd number pixel, and $P_{OUT\,N}$ is an output pixel.

$$P_{OUT\,N}=(P_{2N}+P_{2N+1})/2 \text{ (where } N \text{ is a natural number)} \quad \text{Formula 1:}$$

Figure 5:
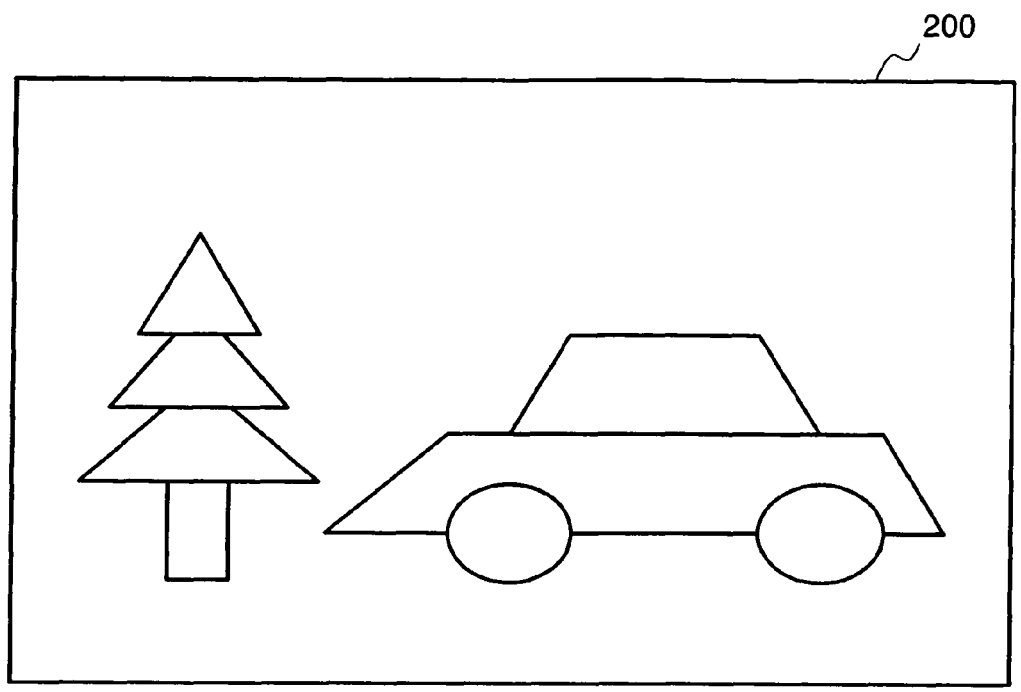
FIG. 5 is a diagram illustrating an example of a moving picture for a sample that is stored on a storage medium 10.
Figure 6:
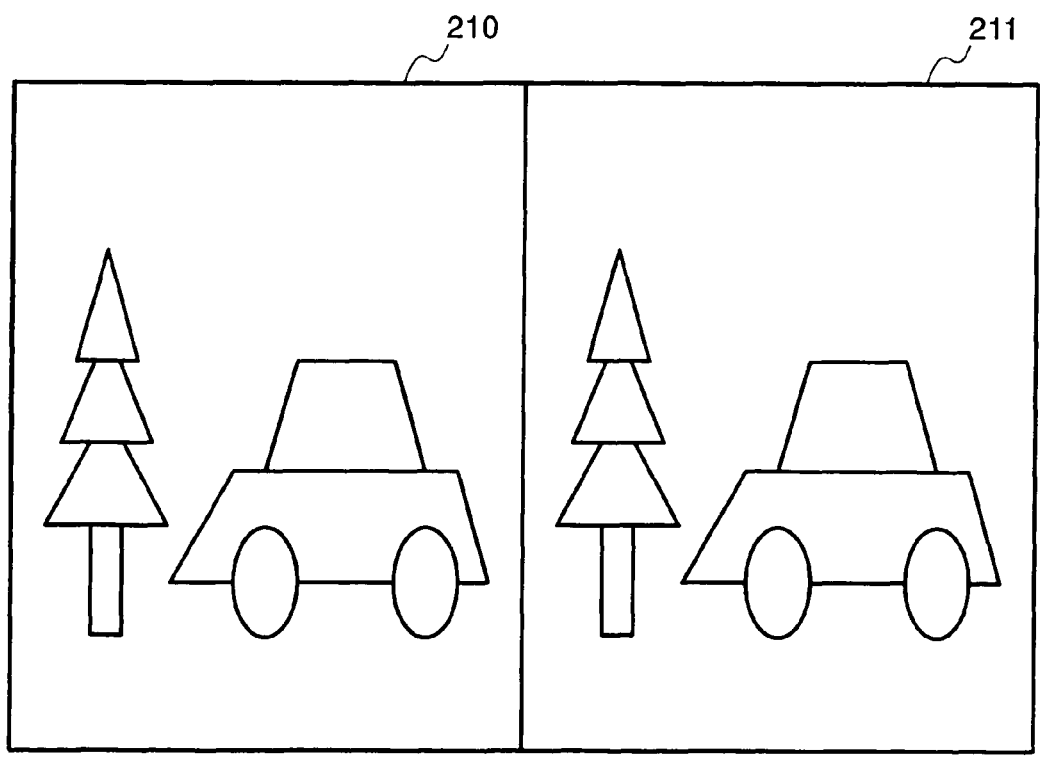
FIG. 6 is a diagram illustrating an example of the moving picture for a samples that are output from a sample processing unit 20.

The output pixels $P_{OUT\,N}$ generated in the above-described manner are written into a memory (not shown) in the sample processing unit 20. A filter in a larger scale than the above maybe utilized to generate the moving picture for a sample reduced in size, without limiting the operation to Formula 1. Alternatively, only the data of $P_{2N}$ may be retrieved and then be written into the memory, or a simple method may be also employed in such a way that only the left half of the original moving picture for a sample shown in FIG. 5 may be retrieved and then be written into the memory. The output pixels $P_{OUT\,N}$ generated in the above-described manner are written into, for example, the left-half area of one horizontal line of the recording area in the memory. The sample processing unit 20 reads the stored data twice and then generates and outputs the moving picture for a samples 210 and 211 having the same picture that are split in the middle of the screen and arranged side-by-side, as shown in FIG. 6. As described above, the sample processing unit 20 reduces the moving picture for a sample as shown in FIG. 5 into half in the horizontal direction, and performs the process so that the moving picture for a samples, being reduced in size are arranged on the left and right sides.

Figure 3:
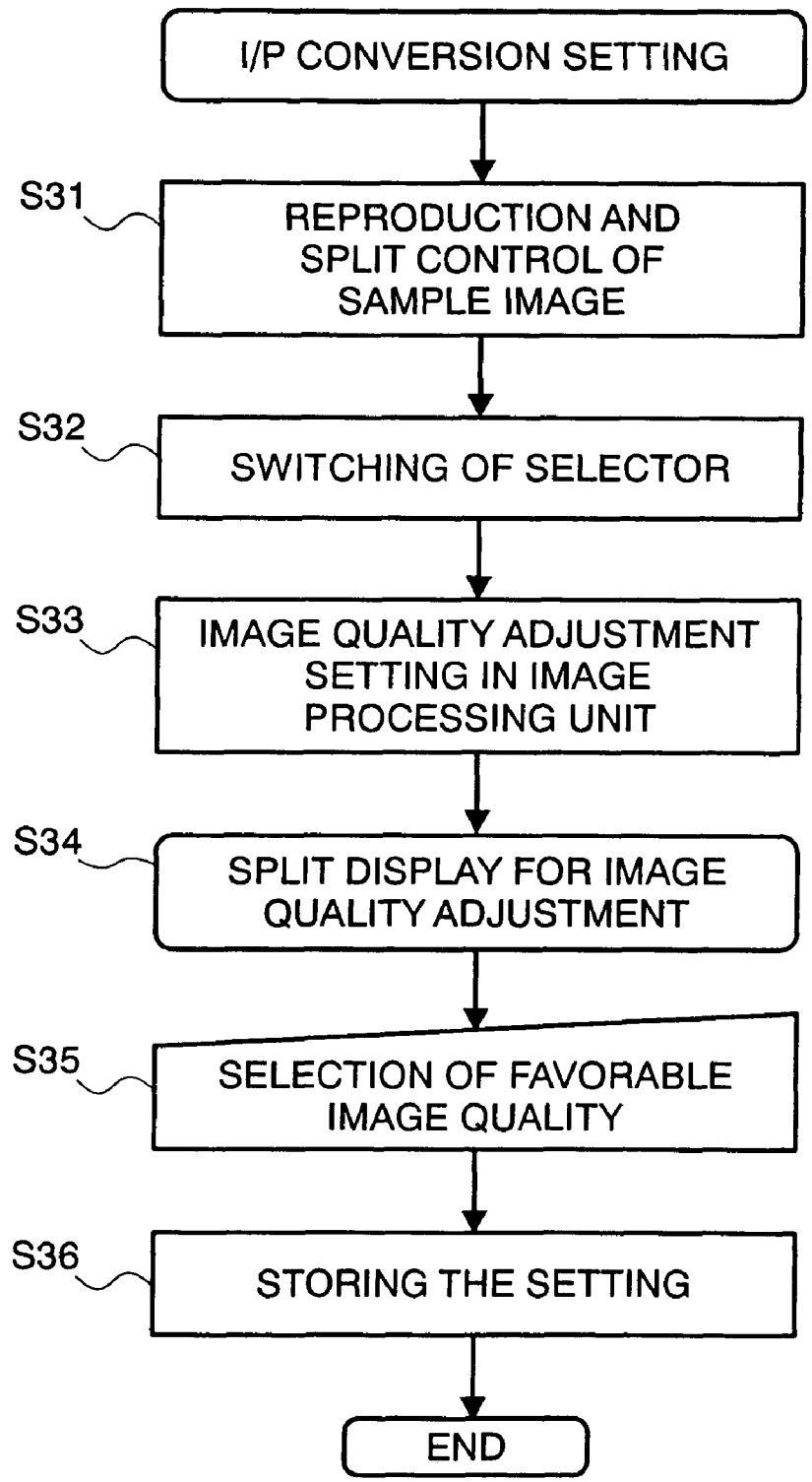
FIG. 3 is a flow chart of a process of the I/P conversion setting according to the first example.
Figure 4:
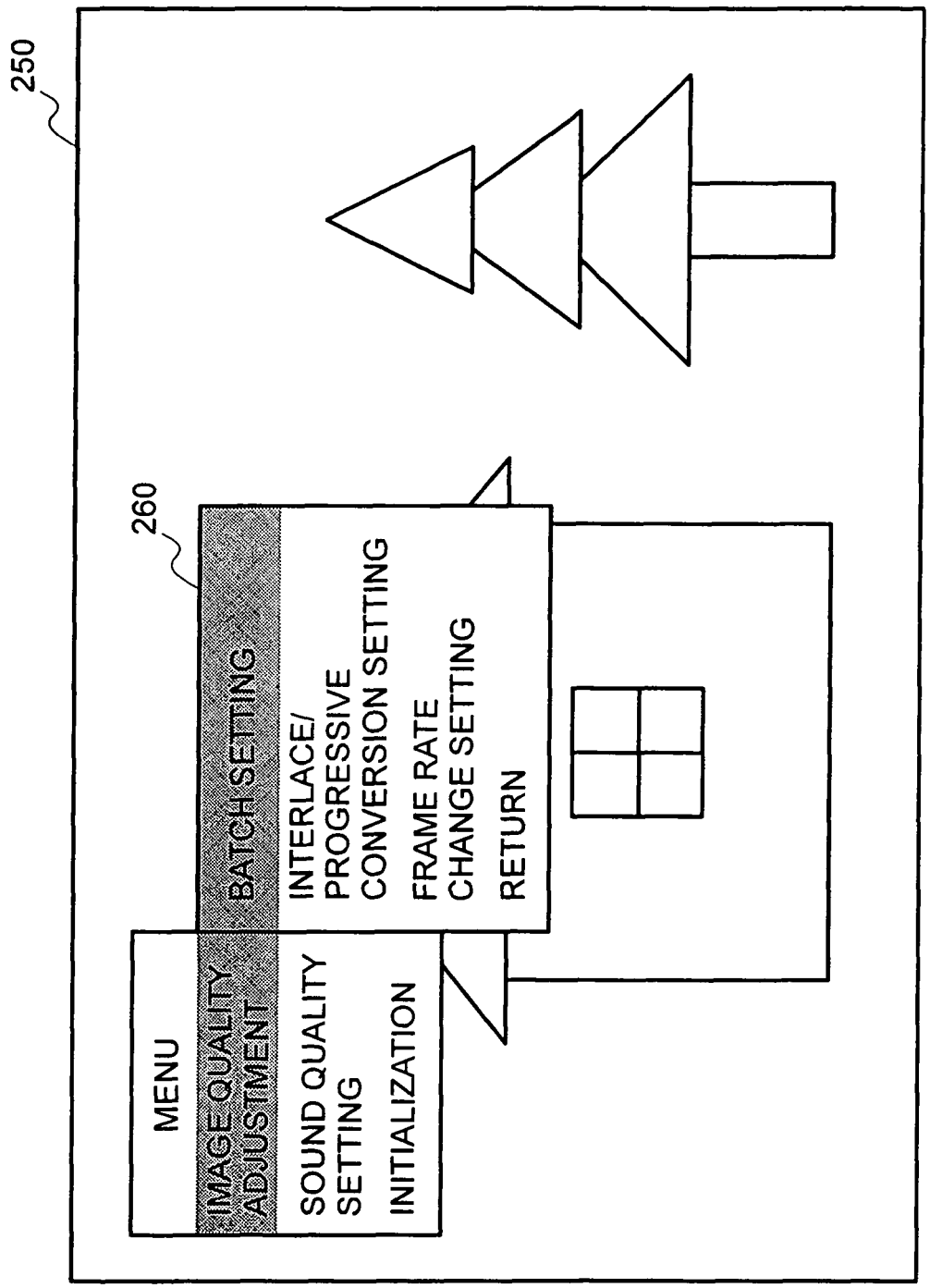
FIG. 4 is a diagram illustrating an example of displaying a menu screen.

The flow shown in the FIG. 3 proceeds to step S32 after the moving picture for a sample is controlled to be reproduced and split in step S32. In step S32, the control unit 60 controls the selector 30 so that the selector 30 selects the output signal from the sample processing unit 20. Thereby, the selector 30 is controlled to switch the output signal from the image signal source 80 to the output signal from the sample processing unit 20. Then, the flow proceeds to step S33 where the image processing unit 40 performs a process of image quality correction for the output signal from the selector 30, that is, the output signal from the sample processing unit 20 in this case.

In the first example, the moving picture for a samples are split in the middle of the horizontal direction of the screen as shown in FIG. 6, and the image processing unit 40 accordingly switches the setting value thereof in the middle of the horizontal direction of the moving picture for a samples. In this case, since the I/P conversion setting is selected, for example, the filter coefficient for creating interpolation pixels to be used for the I/P conversion setting is switched in the middle of the screen. For example, the moving picture for a sample 210 on the left side in FIG. 6 is subjected to the I/P conversion setting processing by using the first filter coefficient, and the moving picture for a sample 211 on the right side is subjected to the I/P conversion setting processing by using the second filter coefficient. Here, the first filter coefficient is set to a coefficient suitable for slow motion that is almost a still image, and the second filter coefficient is set to a coefficient suitable for quick motion.

As well known in the art, when performing the I/P conversion setting process, an interpolation scanning line is inserted between the respective scanning lines of an interlaced image. The interpolation scanning lines (interpolation pixels) are created by using the pixel data of two fields, one of which comes after a certain field in which the interpolation scanning lines (interpolation pixels) existed and the other of which comes before the certain field, and by using the pixel data of two scanning lines, one of which is located above the interpolation scanning line (interpolation pixels) and the other of which is located below the interpolation scanning line. Here, the creation of the interpolation pixels using the pixel data of previous and next fields of the certain field is referred to as inter-field interpolation, and the creation of the interpolation pixels using the pixel data of scanning lines located above and below the certain interpolation scanning line is referred to as inter-line interpolation. The mixing ratio of the inter-field interpolation to the inter-line interpolation is determined based on the motion of the image.

Specifically, when the moving picture contains slight motion, the mixing ratio of the inter-field interpolation to the inter-line interpolation becomes large. On the contrary, when the moving picture contains significant motion, the mixing ratio of the inter-line interpolation to the inter-field interpolation becomes large. That is, the first filter coefficient is a coefficient for increasing the mixing ratio of the inter-field interpolation to the inter-line interpolation, and the second filter coefficient is a coefficient for increasing the mixing ratio of the inter-line interpolation to the inter-field interpolation.

Accordingly, in this example, the moving picture for a sample 210 on the left side of the screen undergoes the I/P conversion setting process by using the first filter coefficient for increasing the mixing ratio of the inter-field interpolation to the inter-line interpolation, and the moving picture for a sample 211 on the right side of the screen undergoes the I/P conversion setting process by using the second filter coefficient for increasing the mixing ratio of the inter-line interpolation to the inter-field interpolation. As a result, the sample moving picture images as shown in, for example, FIG. 7 are created and substantially simultaneously displayed with different visual effects caused by the I/P conversion setting process on the left and right sides of the screen.

Figure 7:
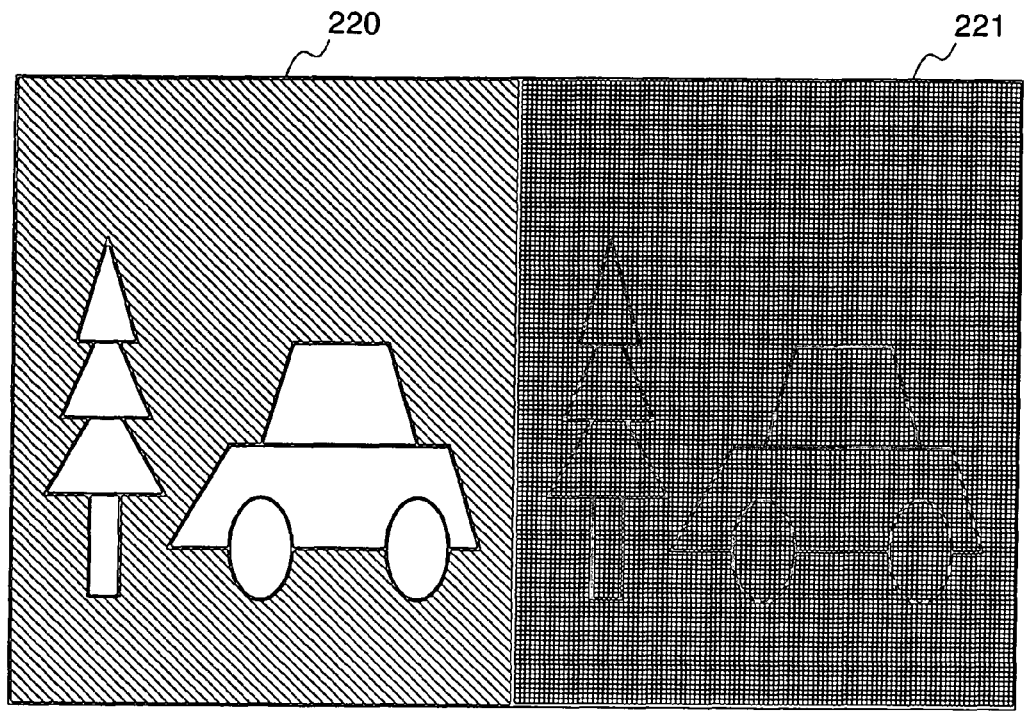
FIG. 7 is a diagram illustrating an example of the sample moving picture images that are output from an image processing unit 40.

Specifically, the sample moving picture images shown in FIG. 7 include the first sample moving picture image 210 whose image quality is set into the first state and the second sample moving picture image 211 whose image quality is set into the second state, so that it is possible to easily recognize the visual effects of the image quality that are designated by the user. The left and right sample moving picture images 210, 211 utilize the initialization values as the setting values to be utilized for the image quality adjustment such as gamma correction and contrast correction, other than the I/P conversion setting processing. Thereby, the left and right sample moving picture images are the same in visual effects other than the I/P conversion setting process. The setting values of the I/P conversion setting process, namely, the first and second filter coefficients are stored in the control unit 60 in advance, and after entering the image quality adjustment mode, the control unit 60 reads the coefficients and then set the coefficients to the image processing unit 40 when performing the image quality adjustment on each of the split moving picture for a samples.

The setting parameters for the other image quality adjustments are set in the same manner as described above, so that the setting parameters corresponding to the kind of image quality adjustment selected by the user is read from the control unit 60 to be set to the image processing unit 40. The setting parameters including the first and second filter coefficients for the respective image quality adjustments may be stored on the storage medium 10 in advance while being associated with the moving picture for a samples. The setting parameters corresponding to the kind of image quality adjustments selected by the user may be read together with the moving picture for a sample from the storage medium 10 when entering the image quality adjustment mode, so that the setting parameters may be set to the image processing unit 40 via the control unit 60.

Figure 8:
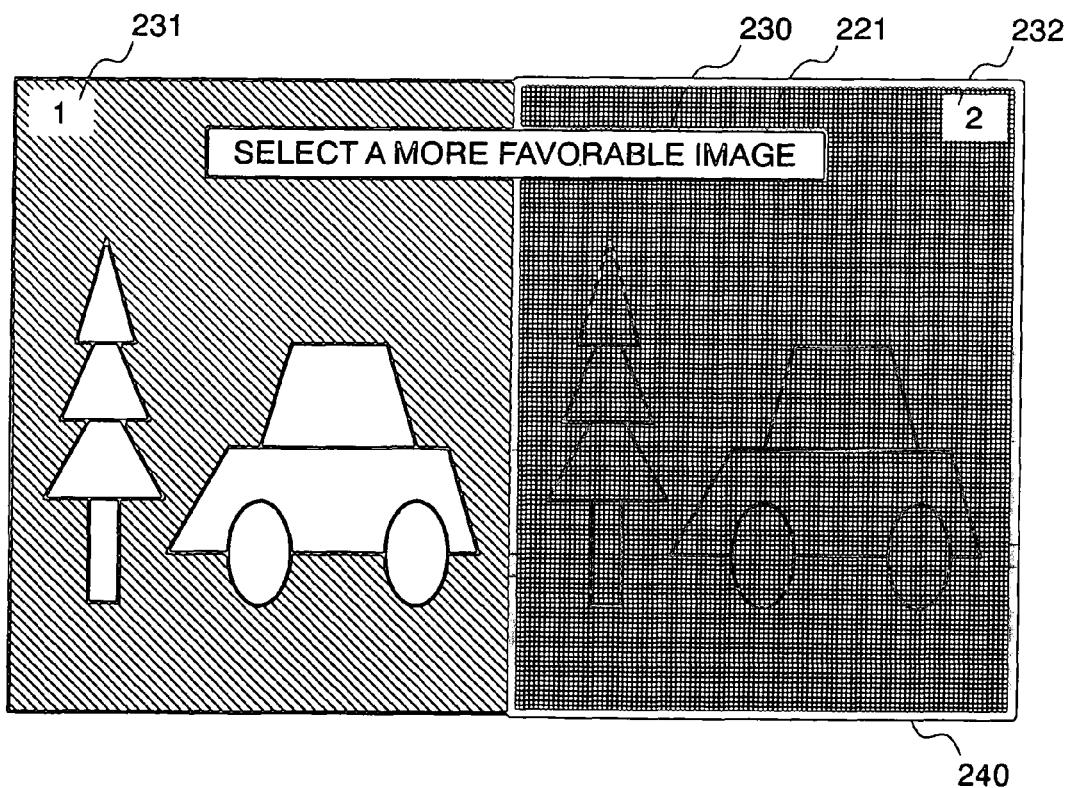
FIG. 8 is a diagram illustrating sample images that are displayed on the screen of a display unit.

Thereafter, in the step S34 (FIG. 3), the information superimposing unit 50 multiplexes one of the sample images as shown in FIG. 7 with, for example, a cursor 240 in response to the instruction issued from the control unit 60 so as to display the image as shown in FIG. 8 on the screen of the display unit 90. The cursor 240 can move on the sample moving picture images in response to the operation of the cursor keys mounted on the operation unit 70, and allow the user to recognize which of the left sample moving picture image 220 and the right sample moving picture image 221 is being selected. As shown in FIG. 8, the items to be multiplexed on the sample moving picture images include, other than the cursor 240, identification numbers 231 and 232 which are respectively associated with the left and right sample moving picture images 220 and 221, and a message 230 containing textual information for prompting the user to select the sample moving picture image. The identification numbers 231 and 232 and the message 230 are also multiplexed on the sample moving picture images by the information superimposing unit 50.

Thereafter, the flow shown in FIG. 3 proceeds to step S35 where the user selects one of the favorable image qualities between the two sample moving picture images 231 and 232 being displayed. Using the cursor 240 as described above, the user may make the selection from the two sample moving picture images 231 and 232 displayed on the display unit 90. In this case, the cursor 230 is made to be positioned on the favorable sample moving picture image, and then the determination button provided on the operation unit 70 is pressed so as to make a selection of the sample moving picture image. The selection from the sample moving picture images 231 and 232 can be also made by pressing channel buttons which are associated with the identification numbers 231 and 232 and which are mounted on the operation unit 70. For example, in the case where the channel button "1" on the operation unit 70 is pressed, the left sample image 231 that is given the identification number 231 associated with the channel button "1" is selected.

When one of the favorable sample moving picture images is selected, the flow proceeds to step S36 where the setting value for the image quality corresponding to the selected sample moving picture image is obtained (that is, selected). For example, when the sample moving picture image 231 is selected in step S35, since the first filter coefficient is utilized for the I/P conversion setting, processing of the sample moving picture image, the first filter coefficient is obtained and set as the setting value for the I/P conversion setting processing in the normal operation mode.

With the above-described operations, the subroutine for the procedure for setting the I/P conversion setting process is completed. Referring to FIG. 2 again, when the subroutine of step S15 is completed, the flow proceeds to step S17 where it is determined again whether or not "batch setting" is selected. When the result is "N", the flow proceeds to step S18 where only the setting parameters for the I/P conversion setting process in the image processing unit 40 is updated (the setting parameters for the FR change process is not updated) by using the filter coefficient obtained in step S15, and then the flow proceeds to step S23.

On the other hand, when the results determined in steps S17 and S16 are "Y", the flow proceeds to step S19 where the subroutine for the FR change process is conducted. The subroutine process in step S19 is basically the same as the subroutine process for the I/P conversion setting process in step S15 as described above, and therefore, the detailed explanations thereof will be omitted. The points where the subroutine process for the FR change process differs from the subroutine process for the I/P conversion setting process are as follows. (1) The storage medium 10 is controlled so that the moving picture for a sample corresponding to the FR change process, for example, a panned image is selected and read among the plurality of moving picture for a samples stored on the storage medium 10. (2) Each of the FR change processes that are different from each other is performed on each of the left and right moving picture for a samples shown in FIG. 6.

For example, the left moving picture for a sample shown in FIG. 6 is, for example, frame-rate changed from 24 Hz to 60 Hz by a 2-3 pull down method. Specifically, the first frame A and the second frame B of the image running at 24 frames per second are run for the second time in a row and for the third time in a row, respectively, so that the frame rate is changed to 60 Hz by periodically repeating the process. Accordingly, the frames of the moving picture for a sample displayed on the left side run in order of AABBB . . . On the other hand, the right moving picture for a sample is frame-rate changed to 60 Hz in such a way that interpolation frames are generated by motion compensation using the first and second frames of the image running at a frame rate of 24 Hz, and inserted into the image. Accordingly, the frames of the moving picture for a sample displayed on the right side run in order of, for example, AA1A2B1B2 . . . In this case, the motion of the right moving picture for a sample becomes smoother than that of the left moving picture for a sample.

The moving picture for a sample running at a frame rate of, for example, 24 Hz is stored on the storage medium 10. The image processing unit 40 changes the frame rate of the moving picture for a sample displayed on the left side to 60 Hz by applying the 2-3 pull down method. Further, the image processing unit 40 changes the frame rate of the moving picture for a sample displayed on the right side to 60 Hz by inserting the interpolation frames generated by motion compensation. That is, the frame rate change setting process differs on the left and right sides. By using the moving picture for a samples thus obtained, the two moving picture for a samples having been subjected to the frame rate change setting processes that are different from each other are arranged and displayed side-by-side on the left and right sides as shown in FIG. 7 or 8. Then, one of the favorable sample moving picture images on the left and right sides is selected in a manner similar to the above-described selection, so that the setting parameters for the selected FR change process (for example, the process of inserting the interpolation frames in the case of selecting the right side) is used as the setting parameters for the FR change process in the normal operation mode. Here, the storage medium 10 may store the moving picture for a sample at a frame rate of 60 Hz which has been subjected to the 2 to 3 pull down in advance. In this case, the image processing unit 40 does not perform the FR change process on, for example, the sample moving picture image displayed on the left side, but may perform the process of inserting the interpolation frames on only the sample moving picture image displayed on the right side.

After the subroutine process is completed in step S19, the flow proceeds to step S20 where it is determined whether or not "batch setting" is selected. When the result is "Y", the setting values for the I/P conversion setting process and the FR change process in the image processing unit 40 are updated by using the filter coefficient for the I/P conversion setting obtained in step S15 and the setting parameters for the FR change obtained in step S19. When the result obtained in step S19 is "N", the flow proceeds to step S22 where only the setting parameters for the FR change process in the image processing unit 40 is updated (the setting parameters for the I/P conversion setting process is not updated) by using the setting parameters obtained in Step 19, and then the flow proceeds to step S23. In step S23, the selector 30 operates so that the image signal output from the image signal source 80 is selected in response to the instruction issued from the control unit 60, assuming that all the image quality adjustments are completed. Thereby, the process of the image quality adjustment is completed to return to the normal operation mode. Note that, when the result determined in step S16 is "N", the process is completed assuming that none of the items relating to the image quality adjustment have been selected from the menu screen 260 shown in FIG. 4.

With the above-described processes, the respective setting parameters for the image quality correction in the image processing unit 40 are updated in accordance with the selection of the moving picture for a sample. In the normal operation mode, the image quality adjustment in accordance with the updated setting parameters is performed on the image signal output from the image signal source 80. Therefore, according to the first example, the states of the images before and after the image quality adjustment can be visually confirmed because of the side-by-side arrangement of the moving picture for a samples that differ from each other in the degree of image quality adjustment such as sharpness setting process or on/off of the image quality adjustment such as the I/P conversion setting process. Further, according to the first example, since the moving picture for a sample for the image quality adjustment is stored in advance on the storage medium, the moving image suitable to the kind of image quality adjustment can be used. Furthermore, according to the first example, since the sample images are moving pictures, it is possible to visually confirm the difference in the processing method for the image quality adjustment, such as the I/P conversion setting process and the FR change process, that is visually effective on only moving pictures.

In the above description of the first example, the I/P conversion setting process and the FR change process are explained as the examples of the image quality adjustments, and however, it goes without saying that the other image quality adjustments may be similarly applicable. Further, in the first example, a plurality of moving picture for a samples suitable for the image quality adjustments can be stored on the storage medium 10. For example, when conducting the contrast correction setting process, the moving picture for a sample that is relatively dark may be retrieved from the storage medium 10, and when conducting the hue and saturation setting process for a specific color (for example, red or blue), the moving picture for a sample, of which the primary colors are vibrant and which is relatively bright, may be retrieved from the storage medium 10. Furthermore, when conducting the sharpness setting process, the moving picture for a sample that includes a plurality of high frequency components may be retrieved from the storage medium 10. Still furthermore, when noise reduction setting process is carried out as the image quality adjustment, one of the left and right moving picture for a samples may be displayed with the noise reduction activated, and the other one may be displayed with the noise reduction inactivated.

In the above description, the selection of the image quality that the user desires is made only once. However, a plurality of selections may be made by changing the moving picture for a sample for use in the image quality setting or the image quality adjustment. Then, the setting parameters for the respective image quality adjustments may be determined by using the setting parameters for the image quality adjustments obtained by respective processes. In the case where the reproduction of the moving picture for a sample is completed before the process of FIG. 2 is completed, the control unit 60 controls the storage medium 10 so that the same moving picture for a sample is reproduced again (e.g. in a loop). Accordingly, the reproduction of the moving picture for a sample may be repeated until the process of the image quality adjustment is completed.

In the first example, two moving picture for a samples are arranged and substantially simultaneously displayed side-by-side on the left and right sides, but this technique is not limited to this two-image side-by-side arrangement. For example, the moving picture for a sample that has been read and then reduced into one third in the horizontal direction may be written into the memory of the sample processing unit 20, the written moving picture for a sample may be read three times, and the three moving picture for a samples may be substantially simultaneously displayed side-by-side. Alternatively, the moving picture for a sample that has been read and then reduced into half in the vertical and horizontal directions is written into the memory, the written sample may be read four times, and the four moving picture for a samples may be substantially simultaneously displayed on the screen that is split into four sections of upper left, upper right, lower left and lower right. Further, with the same process, the moving picture for a sample may be split into nine. The example of splitting the moving picture for a sample into four will be described as the second example with reference to FIGS. 1, 9 and 10.

Figure 9:
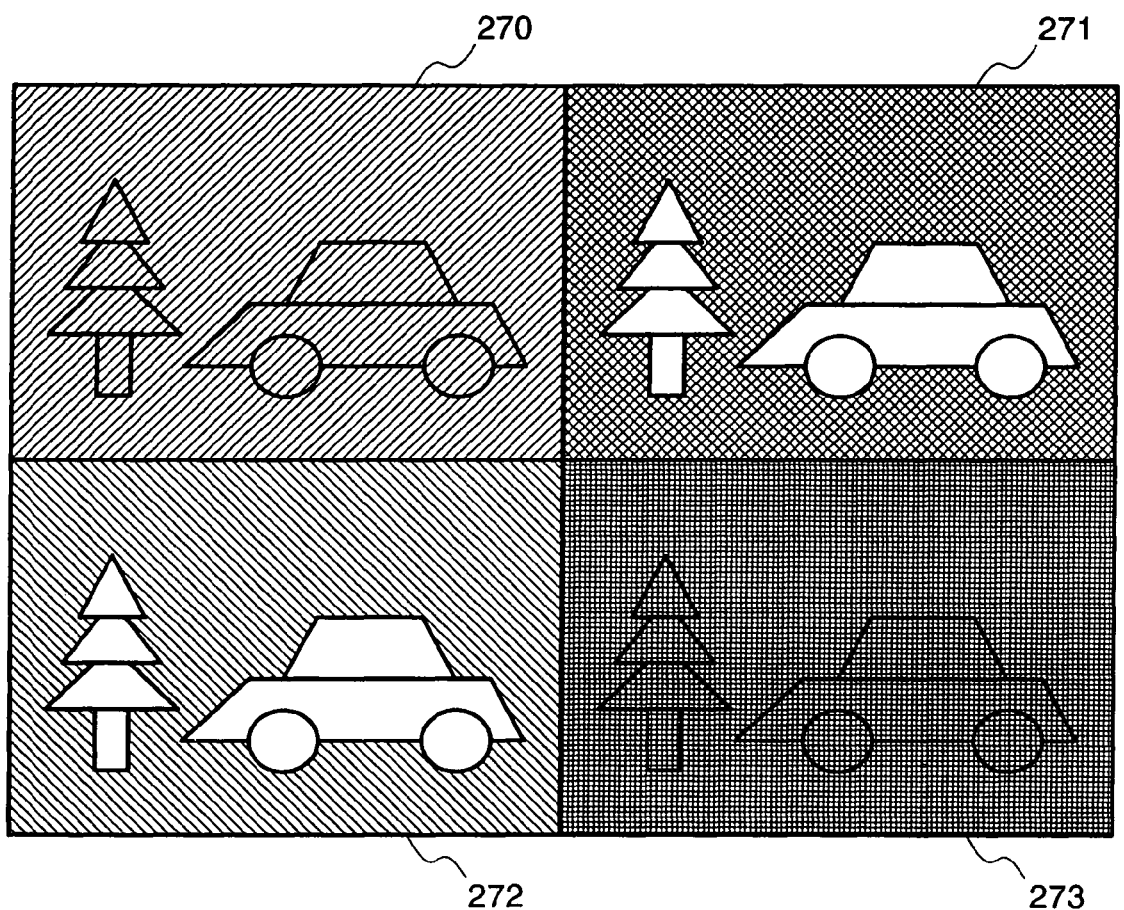
FIG. 9 is a diagram illustrating an example of sample moving picture images in the second example in an image display apparatus.
Figure 10:
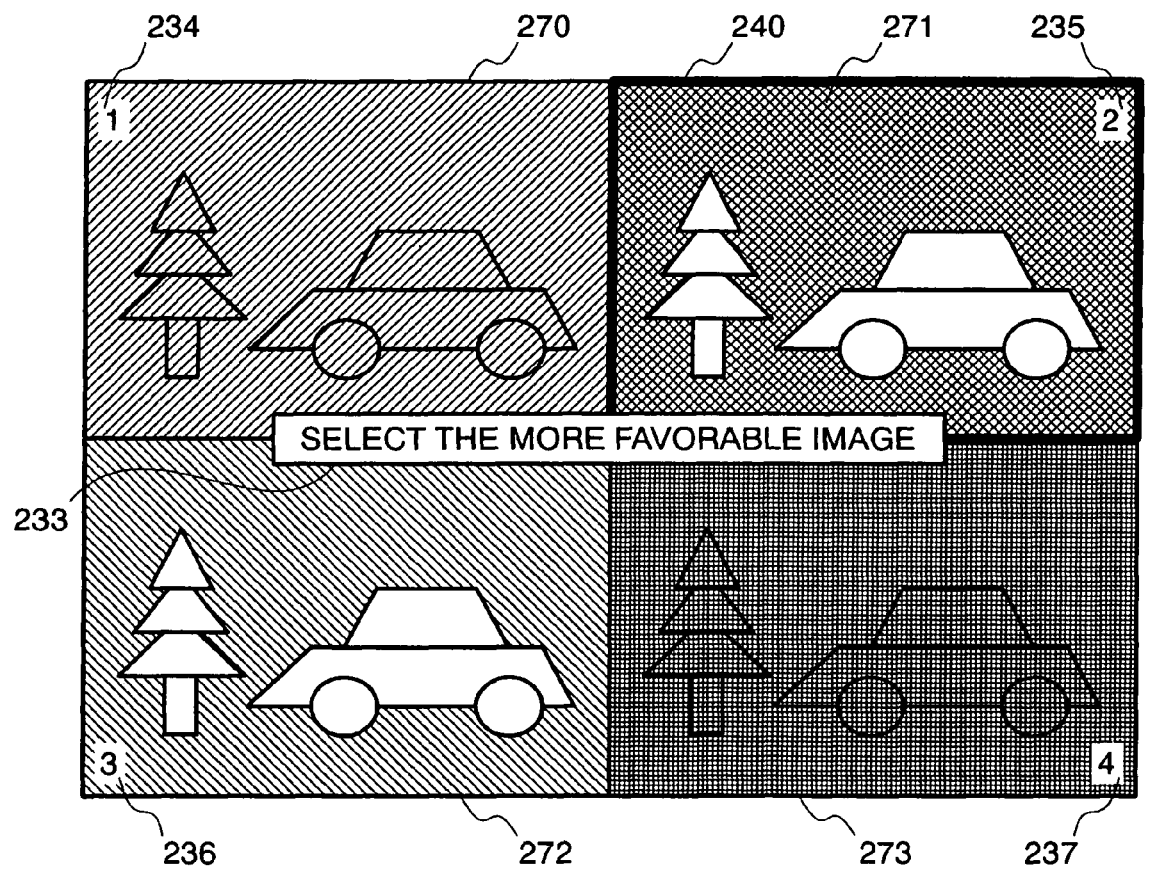
FIG. 10 is a diagram illustrating an example of sample images that are displayed in the second example in the image display apparatus.

In the image quality adjustment mode, the moving picture for a sample read from the storage medium 10 is reduced into half in the vertical and horizontal directions in accordance with Formula 1 by the sample processing unit 20. The data of the reduced moving picture for a sample is written into the memory in the sample processing unit 20. The data is read for the fourth time in a row so as to be supplied to the image processing unit 40 via the selector 30. As a result, the moving picture for a sample stored on the storage medium is split into four. The image processing unit 40 performs the image quality adjustment on each of the four moving picture for a samples that have been split, so that the sample images can be obtained as shown in FIG. 9. For example, in the case where "enhancer" (sharpness) is selected as the image quality adjustment, the degree of enhancer is changed in order of, for example, an upper left sample 270, an upper right sample 271, a lower left sample 272 and a lower right sample 273. As a result, there can be obtained the moving picture for a samples in which the enhancers are changed at four levels. As shown in FIG. 10, the information superimposing unit 50 multiplexes the cursor. 240, the identification numbers 234 to 237 and the message 233 on the moving picture for a samples shown in FIG. 9 so as to be displayed on the screen of the display unit 90. The process of selecting the displayed sample image and the process of obtaining the setting value, for the image quality adjustment accompanying the selection are substantially the same as those in the first example.

According to this configuration, it is possible to visually and finely confirm the degree of image quality adjustment, so that the image quality can be more finely adjusted. In the second example, the sample moving picture images are substantially simultaneously displayed on the screen that is split into four, but may be substantially simultaneously displayed on the screen that is split into nine as described above. Of course, other numbers of moving image replicas showing the different adjustment settings may be used.

Furthermore, it is also possible to change the number of sample moving picture images on the screen corresponding to the kind of the image quality adjustments. For example, when performing the I/P conversion setting process, the control unit 60 controls the system shown in FIG. 1 to display two sample moving picture images on the screen. On the other hand, when performing the enhancer setting process, the control unit 60 controls the system shown in FIG. 1 to display nine sample moving picture images on the screen.

Figure 11:
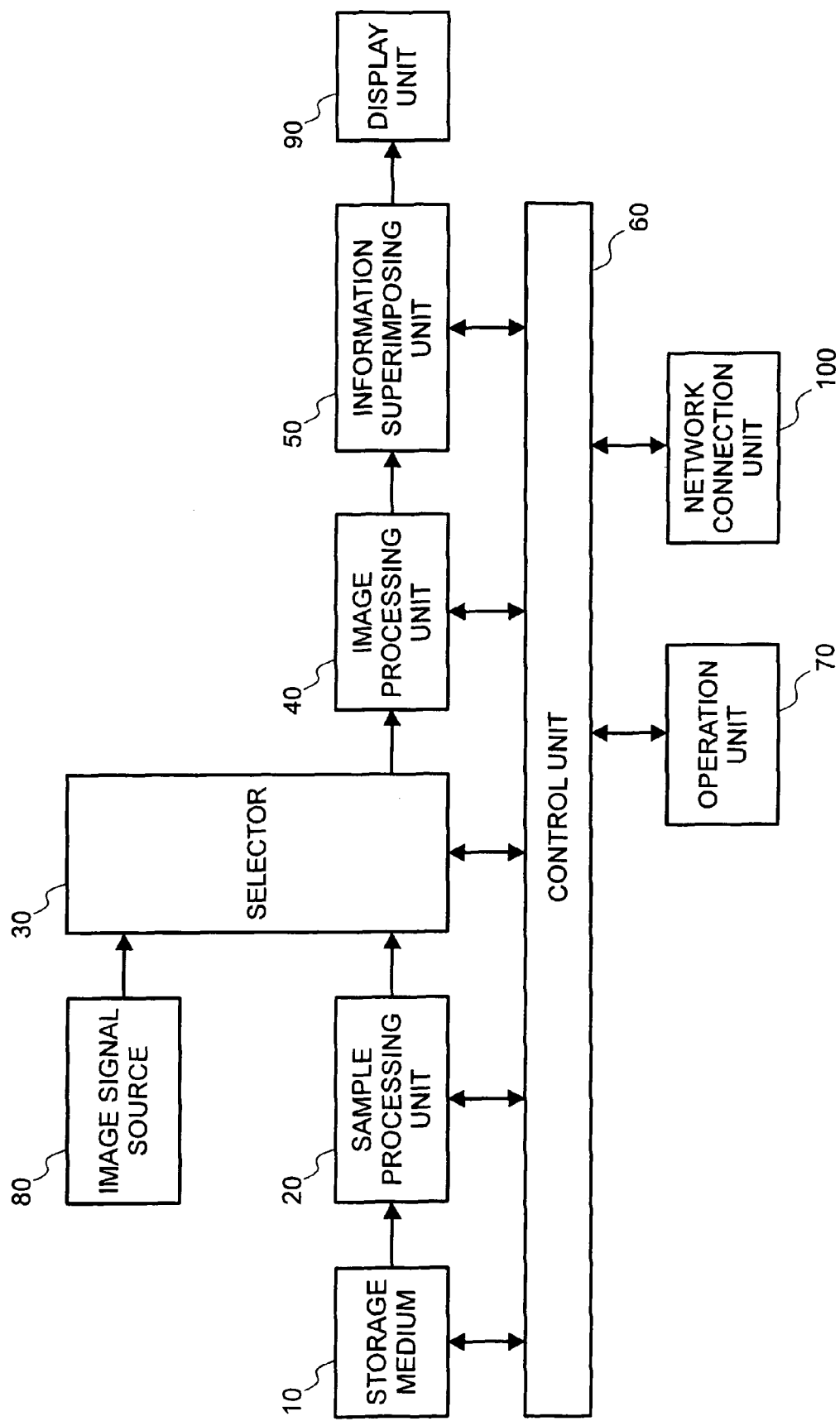
FIG. 11 is a block diagram of the third example in an image display apparatus.

Next, the third example according to this technique will be described with reference to FIG. 11. The third example as shown in FIG. 11 has a configuration in which a network connection unit 100 is added to the configuration of the first example, so that it is possible to communicate with outer networks via the network connection unit 100. The configuration of the image quality adjustment is the same as those in the first and second examples.

The third example makes it possible to transmit the setting data for the image quality adjustment that is set by the user to networks. On the contrary, the setting data for the image quality adjustment on networks can be downloaded. The network connection unit 100 is connected to a control unit 61 so that the transmission/reception of data is carried out in accordance with the control of the control unit 61. Thereby, the setting data for the image quality adjustment that has been appropriately set can be shared with other persons. Specifically, according to the third example, it is possible to provide the setting value for the image quality adjustment that has been set in the image display apparatus in the above-described manner to other persons through networks. On the contrary, it is possible to obtain the data of the setting value for the image quality adjustment that has been set by other persons in another image display apparatus through networks. Thus, the image quality adjustment can be performed using various data.

Further, it is possible to download a new moving picture for a sample for image quality adjustment from networks via the network connection unit 100. The downloaded moving picture for a sample is written into a storage medium 10 via the control unit 61. Then, the image quality adjustment can be performed by using the new moving picture for a sample in the image quality adjustment mode. Thereby, the moving picture for a sample that is more suitable for (specific) image quality adjustment can be obtained, and the image quality adjustment can be preferably performed.

Next, the fourth example according to this technique will be described with reference to FIGS. 1 and 10. The fourth example has a configuration in which the moving picture for a samples that have been split in advance and that have been subjected to image quality adjustment for each of the split samples are stored on the storage medium, unlike the first example in which the moving picture for a sample having been read from the storage medium 10 is subjected to the split process and the image quality adjustment process. The image quality adjustment that has been performed in advance is the same as the image quality adjustment that can be performed in the image processing unit 40.

In the case where the moving picture for a sample stored in the storage medium 10 is not compressed, the sample processing unit 20 converts the sample data into an image data format in which the image processing unit 40 can process the data, as in the same manner as the first example. In the case where the moving picture for a sample stored in the storage medium 10 is the compressed image data, the sample processing unit 20 decompresses the compressed moving picture for a sample, further converts the moving picture for a sample data into an image data format in which the image processing unit 40 can process the data, and outputs the converted data. However, the sample processing unit 20 according to the fourth example is not provided with a function of reducing the image in size and reading the data from the memory multiple times to split the screen, which is different from the first example. This is because the moving picture for a samples stored on the storage medium 10 have already been split.

The image processing unit 40 is provided with a function of performing the image quality adjustments for the image signal, such as the enhancer setting process, the I/P conversion setting process, the FR change process, the gamma setting process, the overdrive setting process for improving the moving picture response of a liquid crystal display device, as similar to the first example. However, unlike the first example, the fourth example is not provided with a function of performing the image quality adjustment for each of the split moving picture for a samples, namely, a function of changing the setting parameters for the image quality adjustment depending on the position where the moving picture for a sample is located in the image quality adjustment mode. This is because the moving picture for a samples stored in the storage medium 10 are split in advance, and the image quality correction has already been made in advance for each of the split samples in the fourth example.

In a manner similar to the first example, in the case of entering the image quality adjustment mode in response to the operation performed on the operation unit 70, the control unit 60 controls the storage medium 10, the sample processing unit 20, the selector 30, the image processing unit 40, and the information superimposing unit 50 so as to perform the process of allowing the user to select the favorable image quality.

For example, in the case where the image quality adjustment of the enhancer setting process is selected, each of the enhancers are provided at four different levels for each of the sample images 270 to 273 as shown in FIG. 10. These moving picture for a samples have been stored in advance on the storage medium 10 in the states of being given the enhancers at four different levels. With the same process as that of the first example, the user selects one image sample, to which the favorable enhancer is given, among the moving picture for a samples to which the enhancers have been given at four levels. In the case of the image quality adjustment of only the enhancer, only the setting of the enhance amount to be utilized in the image processing unit 40 is changed so that the enhance amount is made equal to the image selected by the user. The setting value for the enhance amount may be stored in advance on the storage medium 10, and the enhance amount corresponding to the sample moving picture image selected by the user may be retrieved and read from the storage medium 10 so as to be set to the image processing unit 40. Further, the setting parameters for the enhance amount may be stored in the control unit 60 while being associated with the displaying positions of the moving picture for a samples, and the enhance amount corresponding to the sample moving picture image selected by the user may be retrieved from the control unit 60 so as to be set to the image processing unit 40.

In the case where "batch setting" is selected, the control unit 60 stores the setting value for the enhance amount corresponding to the sample image which the user selected, in the image processing unit 41. In order to consecutively perform the other image quality adjustments, the moving picture for a sample corresponding to the kind of image quality adjustment to be performed is read from the storage medium 10 so as to perform the same process as described above. When all the processes of image quality adjustment are completed, the setting of the image processing unit 40 is finally carried out using the setting parameters for the image quality adjustments that have been stored in the control unit 60.

According to the above-described configuration, it is possible to reduce the number of processes performed by the image processing unit 40 and the sample processing unit 20 in the image quality adjustment mode. Accordingly, it is possible for the user to rapidly respond to the operation for selecting the image quality adjustment mode, and to execute the process for the image quality adjustment.

As described above, the fourth example has a configuration in which the moving pictures for a sample are stored on the storage medium 10 in the state of having been split in advance and having been subjected to image quality adjustment for each of the split images in advance. However, in the case where the image processing unit 40 is provided with a function of switching the setting parameters of the image quality adjustment for each of the split moving picture for a samples, it is not required to adjust the image quality in advance. That is, in this case, the moving picture for a samples that are split in advance may be stored on the storage medium 10 without adjusting the image quality of the samples until play back there of during an adjustment selection procedure.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An image processing apparatus comprising:
a storage medium on which a sample moving picture image is stored;
a signal input unit to which an input moving picture image is inputted;
a processor which generates a first sample moving picture image by setting image quality of at least a portion of the sample moving picture image read from the storage medium into a first state, and a second sample moving picture image by setting the image quality of at least a portion of the sample moving picture image read from the storage medium into a second state that is different from the first state, wherein at least the first sample moving picture image and the second sample moving picture image are displayed on a same screen of a display; and
an operation unit which selects one of the first and second sample moving picture images displayed on the screen, wherein the processor performs an image quality adjustment to the input moving picture image in accordance with the image quality setting of the selected one of the first and second sample moving picture images.

2. The image processing apparatus according to claim 1, wherein the first sample moving picture image and the second sample moving picture image are substantially simultaneously displayed on the same screen of the display.

3. The image processing apparatus according to claim 1, wherein the storage medium comprises a hard disk.

4. The image processing apparatus according to claim 1, wherein the storage medium comprises a semiconductor memory.

5. The image processing apparatus according to claim 4, wherein the semiconductor memory comprises a flash memory.

6. The image processing apparatus according to claim 1, wherein:
the first sample moving picture image and the second sample moving picture image are different from each other in at least one kind of the image quality adjustment selected from among: scanning method including Interlace/Progressive scanning method, the number of frame rates, sharpness, noise reduction, contrast, hue, saturation, gamma, and brightness, and
the first and second sample moving picture images are the same in one or more other image quality adjustments.

7. An image display apparatus for displaying an image on a screen of a display unit, comprising:
a storage medium on which a sample moving picture image is stored;
a signal input unit to which an input moving picture image is inputted;
a processor which generates a plurality of sample moving picture images, which are different from each other in image quality using the sample moving picture image read from the storage medium, wherein the plurality of sample moving picture images are displayed on the screen of the display unit; and
an operation unit which selects one of the sample moving picture images displayed on the screen of the display unit,
wherein the processor performs an image quality adjustment to the input moving picture image in accordance with the image quality of the selected one of the sample moving picture images.

8. The image display apparatus according to claim 7, wherein the display unit displays the plurality of sample moving picture images substantially simultaneously on the screen.

9. The image display apparatus according to claim 7, wherein the input moving picture image is contained in a television broadcasting signal or an image signal output from an image reproducing apparatus.

10. The image display apparatus according to claim 7, wherein the processor generates a first sample moving picture image by setting the image quality of the sample moving picture image read from the storage medium into a first state, and generates a second sample moving picture image by setting the image quality of the sample moving picture image into a second state that is different from the first state, and simultaneously displays the first sample moving picture image and the second sample moving picture image on the screen of the display unit.

11. The image display apparatus according to claim 10, wherein the processor adjusts one or more parameters for setting the image quality of the input moving picture image into the first state when the first sample moving picture image is selected, and adjusts one or more parameters for setting the image quality of the input moving picture image into the second state when the second sample moving picture image is selected.

12. The image display apparatus according to claim 7, wherein the storage medium stores a plurality of sample moving picture images associated with kinds of image qualities.

13. The image display apparatus according to claim 7, further comprising:
a connector that enables a connection to a network;
wherein a setting parameter for image quality adjustment can be transmitted or received through the network.

14. The image display apparatus according to claim 7, further comprising:
a connector that enables a connection to a network;
wherein the sample moving picture image can be received through the network and the received sample moving picture image is stored on the storage medium.

15. The image display apparatus according to claim 7, wherein reading of the sample moving picture image from the storage medium is repeated until the image quality adjustment is completed.

16. An image display apparatus comprising:
a storage medium which stores a sample moving picture image;
a display device which displays a plurality of sample moving picture images that are different from each other in an image quality on a screen in an image quality adjustment mode for adjusting an image quality of an input moving picture image, and which displays the input moving picture image in a normal operation mode;
an operation device capable of selecting one of the image quality adjustment mode and the normal operation mode and capable of selecting at least one of the plurality of sample moving picture images displayed on the screen of the display device in the image quality adjusting mode; and
a processor which adjusts the image quality of the input moving picture image in accordance with a setting parameter for the image quality of the sample moving picture image selected by using the operation device, when the normal operation mode is selected by using the operation device.

17. The image display apparatus according to claim 16, wherein:
the operation device is capable of controlling a cursor displayed with the plurality of sample moving picture images on the screen, and
the cursor indicates a selection of one of the plurality of sample moving picture images displayed on the screen of the display device.

18. The image display apparatus according to claim 16, wherein:
the display device displays an identification number with each of the plurality of sample moving picture images;
the operation device comprises a remote controller; and
the sample moving picture image having the identification number that is the same as a number input from the remote controller is selected.

19. An image processing method comprising:
reading a sample moving picture image from a storage medium;
inputting an input moving picture image;
setting an image quality of the sample moving picture image to obtain a first sample moving picture image and setting the image quality of the sample moving picture image to obtain a second sample moving picture image that is different from the first sample moving picture image in image quality;

outputting at least the first sample moving picture image and the second sample moving picture image so as to display the first and second sample moving picture images on a same screen;

selecting one of the first and second sample moving picture images displayed on the screen; and adjusting an image quality of the input moving picture image in accordance with the image quality of the selected one of the first and second sample moving picture images.

20. An image displaying method comprising:

reading a sample moving picture image from a storage medium;

inputting an input moving picture image;

displaying at least a first sample moving picture image and a second sample moving picture image having a different image quality from the first sample moving picture image on a same screen using the sample moving picture image read from the storage medium;

selecting one of the first and second sample moving picture images displayed on the screen; and adjusting an image quality of the input moving picture image in accordance with the image quality of the selected one of the first and second sample moving picture images.

* * * * *